United States Patent
Benfold et al.

(10) Patent No.: US 12,390,734 B2
(45) Date of Patent: *Aug. 19, 2025

(54) REFINING CAMERA RE-LOCALIZATION DETERMINATION USING PRIOR POSE MODEL

(71) Applicant: Niantic Spatial, Inc., San Francisco, CA (US)

(72) Inventors: Ben Benfold, Oxford (GB); Victor Adrian Prisacariu, Oxford (GB)

(73) Assignee: Niantic Spatial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,233

(22) Filed: Mar. 15, 2024

(65) Prior Publication Data

US 2024/0216809 A1    Jul. 4, 2024

Related U.S. Application Data

(63) Continuation of application No. 17/686,119, filed on Mar. 3, 2022, now Pat. No. 11,957,978.

(51) Int. Cl.
| | |
|---|---|
| A63F 13/53 | (2014.01) |
| A63F 13/213 | (2014.01) |
| A63F 13/216 | (2014.01) |
| A63F 13/5378 | (2014.01) |

(Continued)

(52) U.S. Cl.
CPC ........ *A63F 13/5378* (2014.09); *A63F 13/213* (2014.09); *A63F 13/216* (2014.09); *G06T 7/70* (2017.01); *G06T 19/006* (2013.01); *G06T 2207/20076* (2013.01); *G06T 2207/30244* (2013.01)

(58) Field of Classification Search
CPC .......... A63F 13/25; A63F 13/50; A63F 13/52; A63F 13/525; A63F 13/53; A63F 13/5372; A63F 13/5378; A63F 13/56; A63F 13/216; G06T 7/70; G06T 19/006
See application file for complete search history.

(56) References Cited

U.S. PATENT DOCUMENTS

11,417,069 B1 * 8/2022 Gupta .................... G06V 20/70
11,461,923 B2 * 10/2022 Aoki ....................... G06T 7/292
(Continued)

*Primary Examiner* — Omkar A Deodhar
(74) *Attorney, Agent, or Firm* — Fenwick & West LLP (57) ABSTRACT

The present disclosure describes approaches to camera re-localization that improve the speed and accuracy with which pose estimates are generated by fusing output of a computer vision algorithm with data from a prior model of a geographic area in which a user is located. For each candidate pose estimate output by the algorithm, a game server maps the estimate to a position on the prior model (e.g., a specific cell on a heatmap-style histogram) and retrieves a probability corresponding to the mapped position. A data fusion module fuses, for each candidate pose estimate, a confidence score generated by the computer vision algorithm with the location probability from the prior model to generate an updated confidence score. If an updated confidence score meets or exceeds a score threshold, a re-localization module initiates a location-based application (e.g., a parallel reality game) based on the associated candidate pose estimate.

20 Claims, 7 Drawing Sheets

(51) Int. Cl.
*G06T 7/70* (2017.01)
*G06T 19/00* (2011.01)

(56) References Cited

U.S. PATENT DOCUMENTS

| | | | | |
|---|---|---|---|---|
| 2015/0213590 A1* | 7/2015 | Brown | ............... | G06T 17/05 |
| | | | | 345/419 |
| 2016/0055671 A1* | 2/2016 | Menozzi | ............ | G01C 21/1656 |
| | | | | 701/300 |
| 2018/0341811 A1* | 11/2018 | Bendale | ............... | G06V 20/70 |
| 2020/0302634 A1* | 9/2020 | Pollefeys | ............... | G06T 7/70 |

* cited by examiner

REFINING CAMERA RE-LOCALIZATION DETERMINATION USING PRIOR POSE MODEL

CROSS-REFERENCE TO RELATED APPLICATIONS

This application is a continuation of U.S. application Ser. No. 17/686,119, filed Mar. 3, 2022, which is incorporated by reference.

BACKGROUND

1. Technical Field

The subject matter described relates generally to camera localization, and, in particular, to generating improved pose estimates for a client device using fused localization data.

2. Problem

Camera re-localization generally refers to a process for determining the location and orientation (collectively "pose") of a camera within an environment using images captured by the camera. Camera re-localization has a wide and increasing array of uses. In augmented reality (AR) applications, a virtual environment is co-located with a real-world environment. If the pose of a camera capturing images of the real-world environment (e.g., a video feed) is accurately determined, virtual elements can be overlaid on the depiction of the real-world environment with precision. For example, a virtual hat may be placed on top of a real statue, a virtual character may be depicted partially behind a physical object, and the like.

Existing re-localization methods process frames captured by a camera using computer vision algorithms to estimate the pose of a mobile phone or other AR-enabled device. However, these algorithms often output pose estimates that do not accurately match the position and orientation of the device. While a confidence score for a pose estimate may be sufficiently high to trigger initiation of an AR application, a false match may cause the system to generate a representation of an incorrect portion of the virtual world. Conversely, the system may need to make a second attempt at camera re-localization if the initial confidence score for a pose estimate does not meet a score threshold, delaying the start of the application and frustrating the user.

SUMMARY

The present disclosure describes approaches to camera re-localization that improve the speed and accuracy with which pose estimates are generated by fusing the output of a computer vision algorithm with data from a prior model of the geographic area in which the user is located. The prior model uses data from a plurality of sources to generate probabilities regarding where users are likely to be located as well as the likely viewing directions and velocities of the users' client devices. For each candidate pose estimate output by the algorithm, a game server maps the estimate to a position on the prior model (e.g., a specific cell on a heatmap-style histogram) and retrieves a probability corresponding to the mapped position. A data fusion module of the game server fuses, for each candidate pose estimate, the confidence score generated by the computer vision algorithm with the location probability from the prior model to generate an updated confidence score. If an updated confidence score meets or exceeds a score threshold, a re-localization module initiates a location-based application (e.g., a parallel reality game) based on the associated candidate pose estimate.

In one or more embodiments, a computer-implemented method is disclosed. The method includes: receiving camera frame and sensor data from a client device associated with a location-based application; inputting the received data into a computer vision algorithm to generate one or more candidate pose estimates, each pose estimate representing a prediction of a three-dimension position and orientation of the client device and having an associated confidence score; mapping each candidate pose estimate to a position in a prior model of a geographic area in which the client device is located; determining a probability that the client device is located at each of the identified positions; for each candidate pose estimate, fusing the confidence score with the probability to generate an updated confidence score; selecting an authoritative candidate pose estimate having an updated confidence score that meets or exceeds a score threshold; and initiating the location-based application on the client device based on the selected pose estimate. In other embodiments, a system configured to perform the method and a non-transitory computer-readable storage medium storing instructions for performing the method are disclosed.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where camera localization data is desirable. For example, the method described herein may be implemented in a location-based application that displays virtual navigation instructions or text labels that relate to real-world information. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
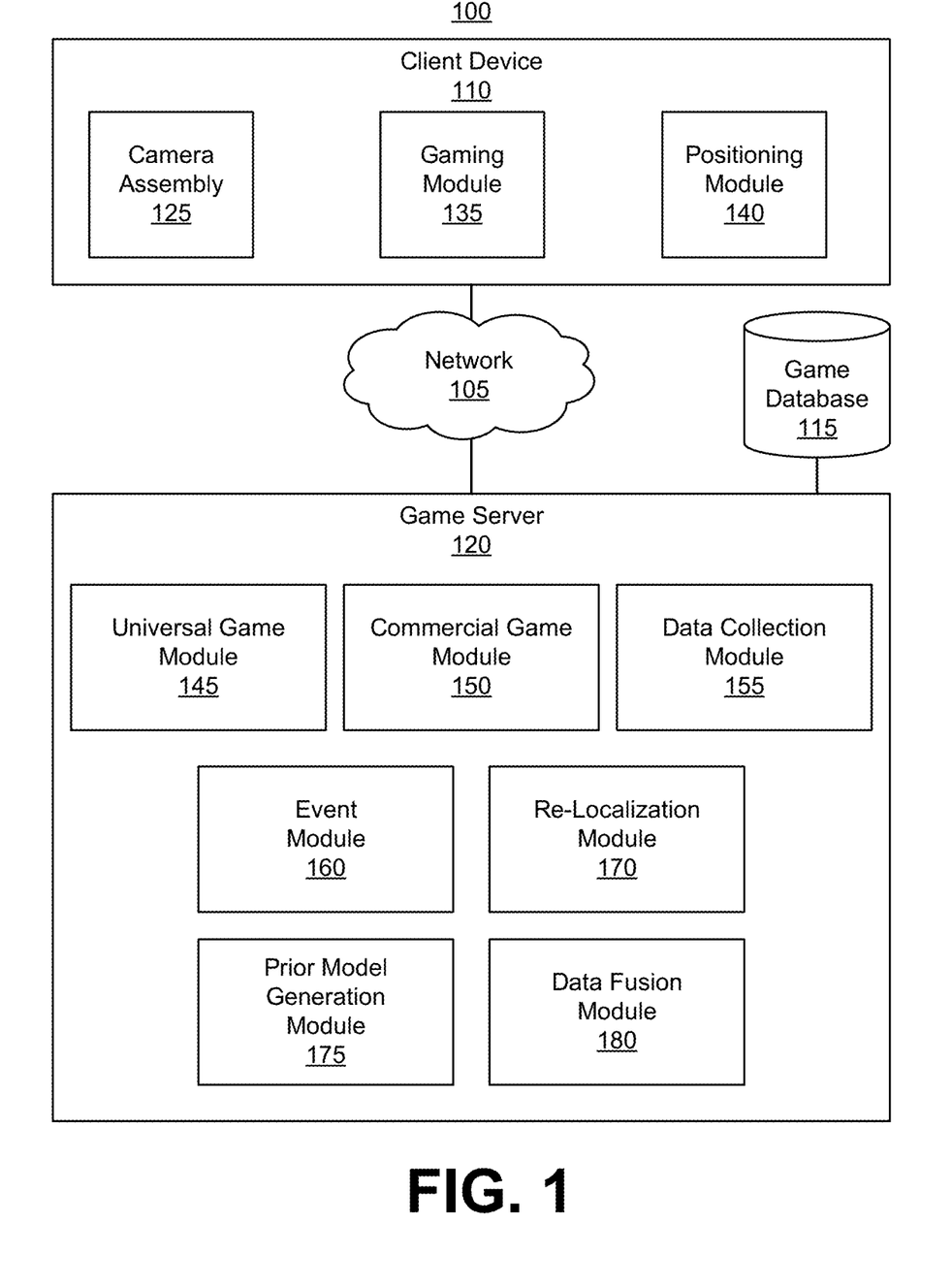
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

Figure 2:
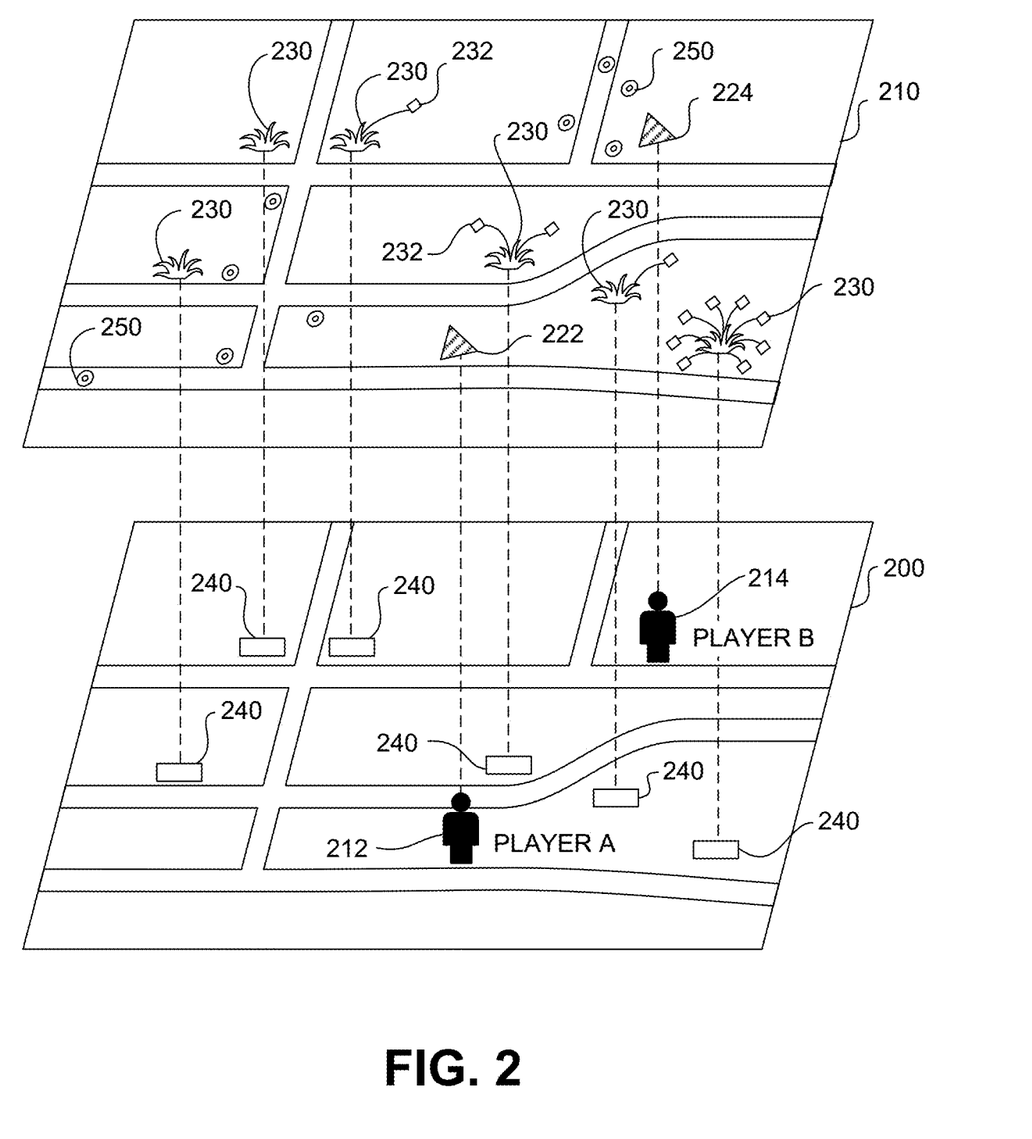
FIG. 2 illustrates a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, depth sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data. In other embodiments, the gaming module 135 generates virtual objects for display on a semi-transparent display through which the user views the real world (e.g., an AR headset, AR glasses, etc.). Thus, the virtual objects may be overlaid on the user's view of the real world.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information. In another example, the gaming module 135 may update a virtual element based on a pose of the camera assembly, e.g., as determined by the re-localization module 145.

In one embodiment, determination of a coarse position of the client device 110 may be performed at the client device 110. The client device 110 includes a positioning module 140 comprising any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location. While the positioning module 140 may be used to determine a course position of the client device 140, re-localization of the client device 110 (e.g., to determine the device's fine-grain location and orientation) is performed by the re-localization module 170 on the game server 120, as discussed below. For example, the coarse location (e.g., the GPS coordinates) identified by the positioning module 140 may be used to identify a three-dimensional (3D) model of the environment in which the client device 110 is located, and the re-localization module 170 localizes against the retrieved model using images captured by the camera assembly 125 on the client device 110.

In embodiments in which a coarse position of the client device is determined client-side, the positioning module 140 tracks the position of the player as the player moves around with the client device 110 in the real world and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, a re-localization module 170, a prior model generation module 175, and a data fusion module 180. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120. Additionally, while the re-localization module 170 is described as located on the game server 120, in other embodiments, re-localization is performed at the client device 110, as discussed above.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The re-localization module 170 uses a computer vision algorithm to estimate the pose of the one or more cameras of the camera assembly 125. The re-localization module 170 is trained to determine the relative pose of a camera from one or more images captured by that camera relative to one or more existing images of the physical environment around the client device 110. In one embodiment, the re-localization module 170 uses GPS coordinates (e.g., received from the positioning module 140 on the client device 110) to retrieve a 3D model of the environment in which the client device 110 is located. In various implementations, the 3D model may be a point cloud or mesh topology generated from previously captured images of the environment. The re-localization module 170 then compares the one or more images captured by the camera assembly 125 to the retrieved 3D model to generate the pose estimate of the client device 110.

Figure 4:
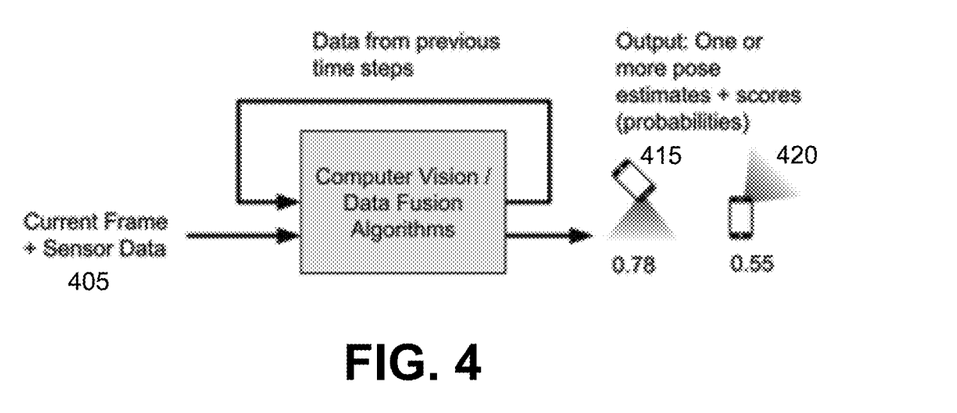
FIG. 4 illustrates use of a computer vision algorithm to generate one or more pose estimates and associated scores for a client device, in accordance with one or more embodiments.

After processing a frame captured by a camera on the client device 110, the re-localization module 170 outputs one or more candidate pose estimates and associated scores, each score representing the probability that the candidate pose estimate (i.e., the estimated 3D position and orientation of the device 110) is correct. For example, FIG. 4 illustrates use of a computer vision algorithm to generate one or more pose estimates for client device. As shown in FIG. 4, input to the computer vision algorithm comprises current frame and sensor data 405 received from the client device 110. Sensor data may include data from one or more sensors on the client device 110 that may aid in accurately positioning the client device 110 location, including but not limited to movement sensors, accelerometers, gyroscopes, other inertial measurement units (IMUs), barometers, positioning systems, thermometers, light sensors, depth sensors, etc. As discussed above, the frame data input comprises one or more images captured by a camera on the client device 110. The output of the algorithm comprises one or more estimated poses of the client device 110. For instance, in the example shown in FIG. 4, the output comprises a first candidate pose estimate 415 having an associated score of 0.78 representing a probability that the estimate 415 is correct and a second candidate pose estimate 420 having an associated score of 0.55 representing a probability that the estimate 420 is correct.

Returning now to FIG. 1, the prior model generation module 175 generates and maintains a prior model that uses data from a plurality of sources to estimate likelihoods that a user device is positioned at each of a plurality of real-world locations. The prior model represents the game server 120's knowledge of the likelihood of a user being located at each of the plurality of locations independent of the data received from the client device 110 (e.g., before the game server 120 receives or processes any frame or sensor data from the client device 110). The prior model is therefore a fixed representation, independent of the specific user for whom it is used to predict one or more likely locations. In various embodiments, the prior model further indicates probabilities regarding the orientation and velocity of the client device 110 at each of the plurality of real-world locations.

The prior model generation module 175 uses data from a variety of sources to construct the prior model and may update and refine the model as additional data is received (e.g., modifying the likelihoods that a user is located at each of the locations represented in the model). In one embodiment, a first data type comprises mapping scan data representing one or more of device location, orientation, and velocity from mapping scans captured by client devices (e.g., during a map generation process). A second data type that may be used to update and improve the accuracy of the prior model comprises real user locations, i.e., the position, orientation, and velocity of client devices 110 as determined using the method described herein. Still further, a third data type for constructing and updating the prior model comprises existing map data, such as the locations of roads, paths, buildings, and the like. Rules of expected user behavior may be applied to the existing map data to estimate the likelihood of users being in particular locations. For example, the rules may indicate that a user is more likely to travel parallel to a road than perpendicular to it and more likely to travel to the side of the road (e.g., on a sidewalk) than down the middle of the road.

In one embodiment, the existing map data may be used to produce general models for how map features behave, for example, the likelihood of user location given a specified distance from a road. These general models can then be applied to similar map structures to generate a prior model for a given geographic area. For example, the general structure-relative model parameters may be generated from specific locations where user location data exists:

$$M = \mathrm{argmax}_m p(\{e_i\} \mid m, s)$$

where $e_i$ is the set of example locations and s is the map structure information around the sample locations. The prior model for a given location may be generated by applying the general structure-relative model to local map structures to calculate the probability that a user is at the location p (x|M, s). One of skill in the art will appreciate that additional or alternative data sources may be used to generate and update the prior model.

The prior model may illustrate the user location likelihoods using a variety of data representation methods. In the embodiment shown in FIG. 5, the prior model is a heatmap-style histogram 500 where each cell represents a particular real-world location (e.g., an N×N meter, such as a 5×5 meter square, or a S2 cell) having an associated probability or range of probabilities that the client device 110 is positioned at the location represented by the cell. One of skill in the art will appreciate that other data representations, such as Gaussian models, may be used in other embodiments. Additionally, in addition to location probability, in varying configurations, the prior model represents the probabilities that the client device 110 is oriented in different directions when the user is located in the cell or that the user is traveling in particular directions.

Figure 5:
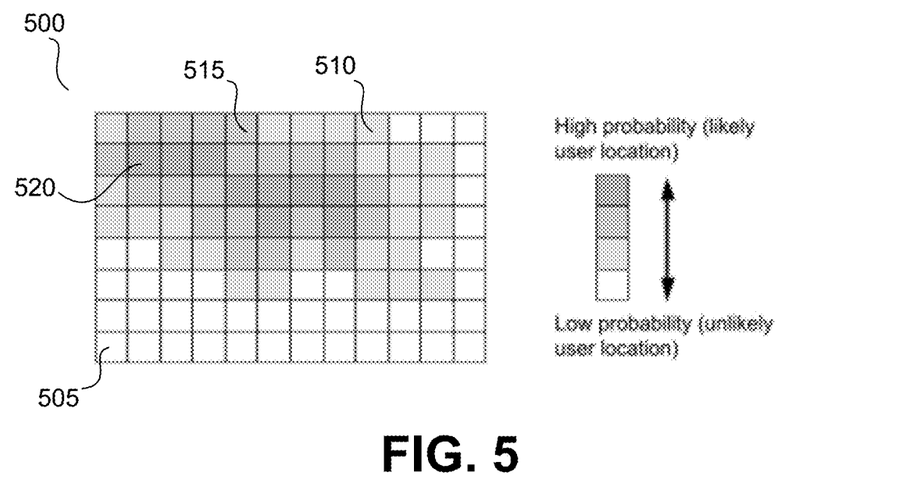
FIG. 5 illustrates a heatmap-style prior model representing likelihoods that a client device is located at each of a plurality of locations, in accordance with one or more embodiments.

In embodiments in which the prior model is a heatmap, such as the embodiment shown in FIG. 5, each probability or range of probabilities is represented by a different color, shading, pattern, or other characteristic to distinguish cells having varying likelihoods of representing the user location. For example, the heatmap 500 includes a plurality of cells, such as the cell 505 having a first probability or probability range, the cell 510 having a second probability or probability range, the cell 515 having a third probability or probability range, and the cell 520 having a fourth probability or probability range where the cell 505 (and the cells having the same the same shading as the cell 505) has a lowest probability of representing the user location, and the cell 520 (and the cells having the same shading as the cell 520) has a highest probability of representing the user location. Cells sharing a color, shading, pattern, or other distinguishing characteristic may be located adjacent to each other in the heatmap 500 or may be separated by one or more cells having different location probabilities. While the heatmap 500 shown in FIG. 5 contains 96 cells, one of skill in the art will appreciate that heatmaps or other prior model representations of varying sizes may be used in other embodiments. Moreover, one of skill in the art will recognize alternate means of visualizing probabilities associated with the underlying heat map data, for example, by representing the data as a probability in the range of 0.0-1.0 instead of as discrete values.

Figure 6:
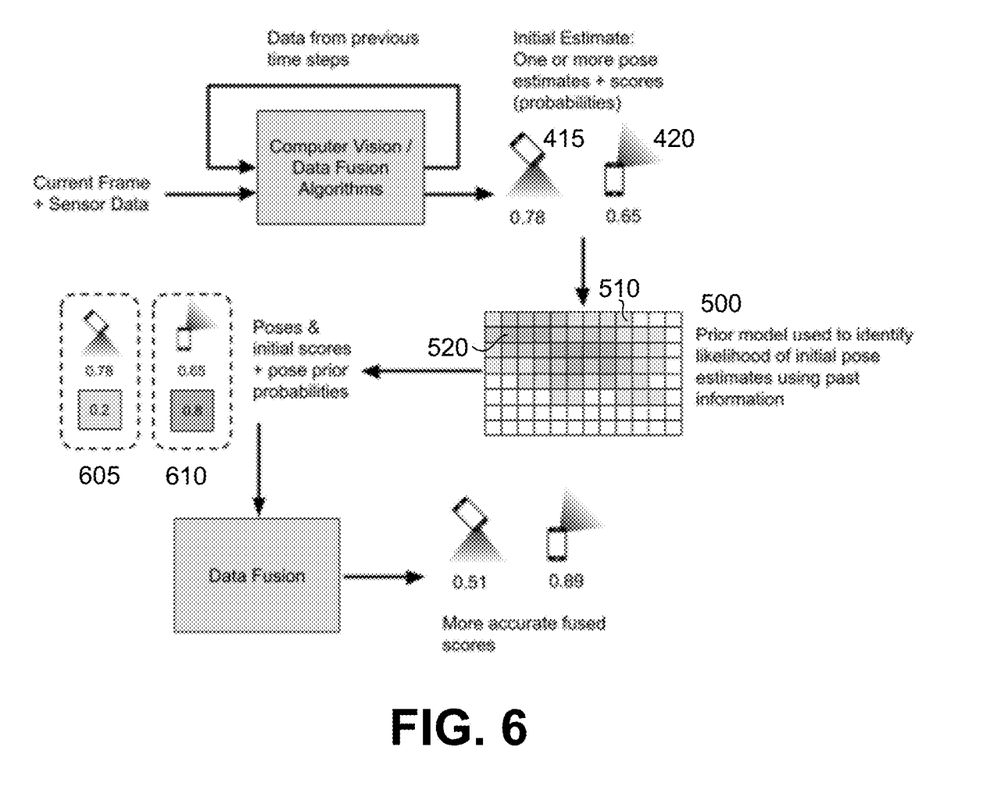
FIG. 6 illustrates data fusion of the pose estimate scores generated in FIG. 4 with probabilities generated by the prior model of FIG. 5 to generate updated pose estimate scores, in accordance with one or more embodiments.

The data fusion module 180 fuses confidence scores generated by the computer vision algorithm with location probabilities from the prior model to produce more accurate scores for each of the candidate pose estimates and allow localizations to be accepted more quickly and/or with a lower failure rate. For example, FIG. 6 illustrates data fusion of the pose estimates scores generated in FIG. 4 with probabilities generated by the prior model of FIG. 5 to determine updated pose estimate scores, in accordance with one or more embodiments. As discussed above with respect to FIG. 4, the output of the computer vision algorithm comprises a first candidate pose estimate 415 having an associated score of 0.78 and a second candidate pose estimate 420 having an associated core of 0.65. For each candidate pose estimate, the data fusion module 180 identifies where in the prior model (e.g., in which cell on the heatmap 500) the candidate pose estimate would place the user and retrieves the corresponding probability for the identified cell. For example, the data fusion module 180 may determine that the candidate pose estimate 415 is represented by the cell 510 of the heatmap 500 while the candidate pose estimate 420 is represented by the cell 520. As discussed above with respect to FIG. 5, the prior model indicates that the probability that a user is located in the real-world location represented by cell 520 is higher than the probability that the user is located in the location represented by the cell 510. Accordingly, while the first candidate pose estimate 415 has an initial score of 0.78, the data fusion module 180 uses the heatmap 500 to determine that a probability 605 that the estimate 415 is accurate is 0.2. Similarly, while the second candidate pose estimate 420 has an initial score of 0.65, the data fusion module 180 may determine that the probability 610 that the estimate 420 is accurate is 0.8. The candidate poses 415 and 420, initial scores, and pose probabilities 605 and 610 generated by the data fusion module 180 may be fused to generate updated fused scores for each of the candidate poses 415 and 420. For example, the data fusion may indicate that the first candidate pose 415 has a fused score of 0.51 and the second candidate pose 420 has a fused score of 0.89. Accordingly, the combination of current frame and sensor data from a specific client device 110 (represented by the output of the computer vision algorithm) with the prior model (generated by data other than from the specific client device 110) yields updated fused scores that provide more accurate localization estimates of the client device 110.

In one embodiment, determination of a pose estimate having a sufficiently high confidence level may be required to initiate an augmented reality experience in the parallel reality game on the client device 110. To determine whether a candidate pose estimate may be accepted, the re-localization module 170 compares the corresponding updated fused score to a score threshold and triggers initiation of the game if the score is at or above the required threshold. This threshold may be adjusted to optimize for different parameters, such as accuracy (in which case, the threshold may be higher), speed (in which case, the threshold may be lower to allow the game to start more quickly), or both. If multiple candidate pose estimates have updated confidence scores that exceed the score threshold, the re-localization module 170 may select the highest scoring candidate pose estimate as authoritative. Responsive to selecting a candidate pose estimate as authoritative (i.e., determining a real-world 3D position and orientation of the client device 110), the universal game module 145 determines a corresponding position and orientation of the user in the virtual world and generates game content (e.g., one or more virtual elements) based on the virtual world position.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
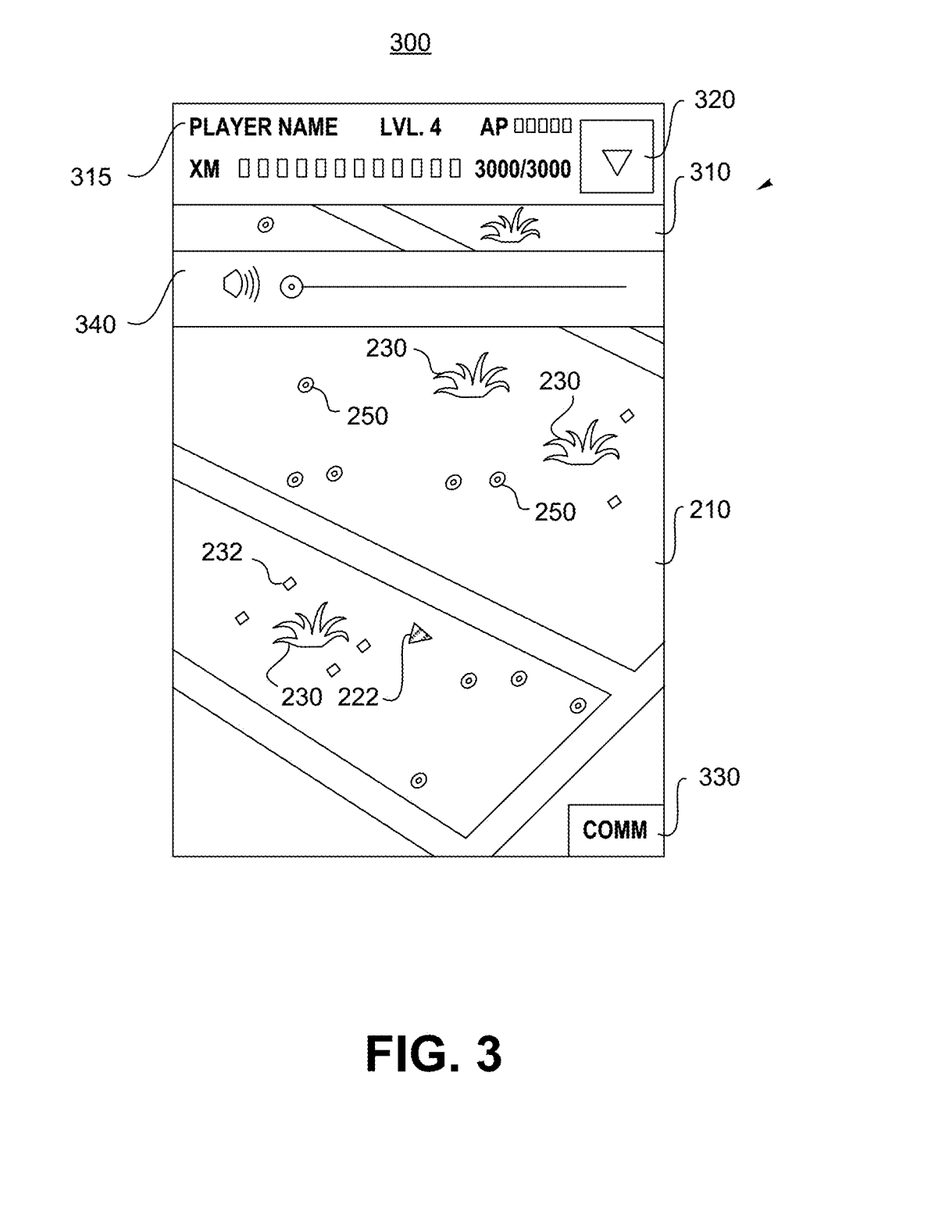
FIG. 3 illustrates an exemplary game interface of a parallel reality game, in accordance with one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Example Methods

Figure 7:
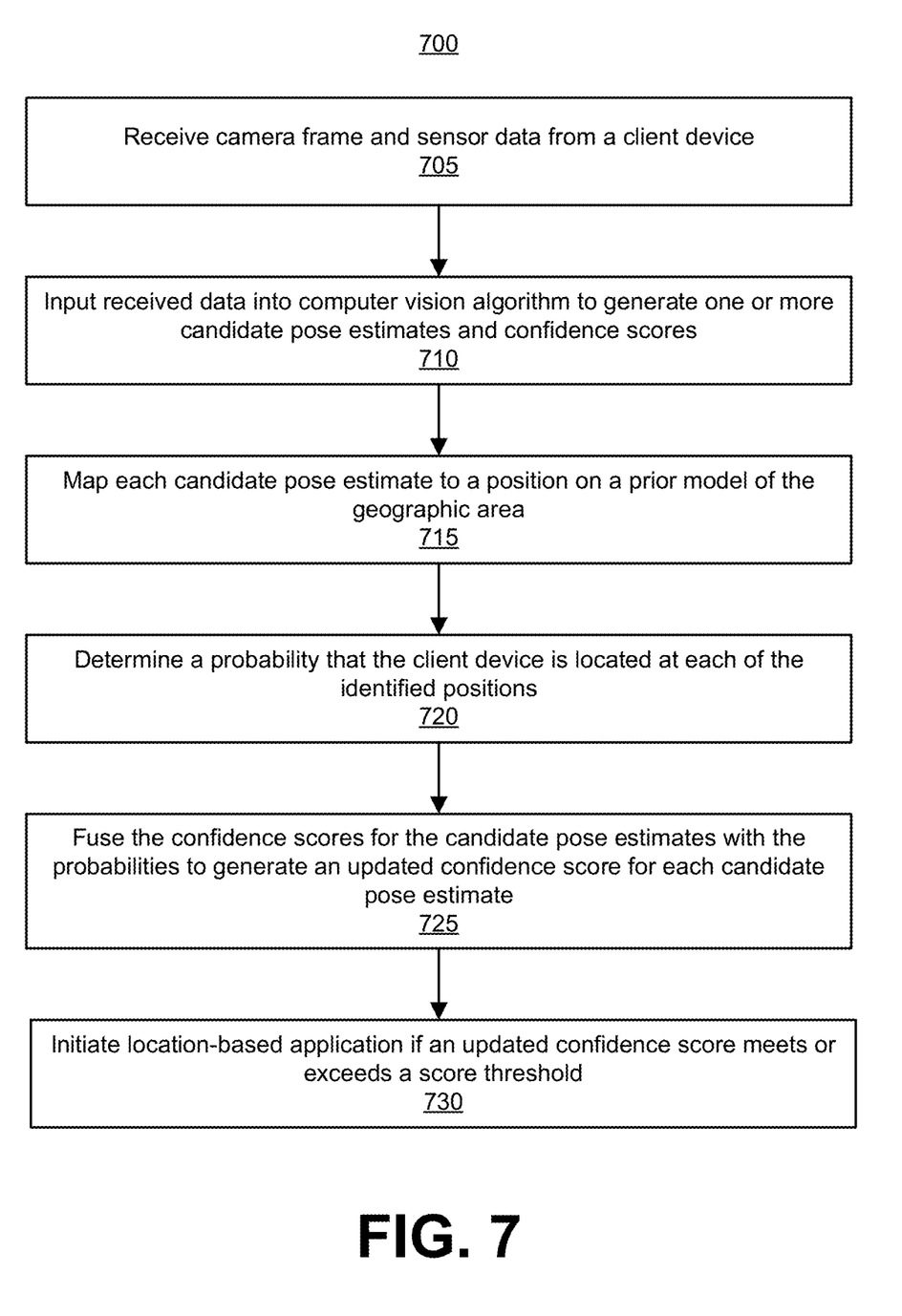
FIG. 7 is a flowchart describing a general process of generating improved pose estimates for a client device using fused localization data, in accordance with one or more embodiments.

FIG. 7 is a flowchart describing one iteration of a method 700 of generating improved pose estimates using fused localization data, in accordance with one or more embodiments. The steps of FIG. 7 are illustrated from the perspective of the game server 120 performing the method 700. However, some or all of the steps may be performed by other entities and/or components. In addition, some embodiments may perform the steps in parallel, perform the steps in different orders, or perform different steps.

In the embodiment shown, a game server 120 communicates with a client device 110 over a network 105 to provide a location-based application, such as parallel reality game, to a user of the client device 110. The method 700 begins with a re-localization module 705 of the game server 120 receiving 705 camera frame and sensor data from the client device 110. The camera frame data comprises one or more images captured by a camera on the client device 110 while the sensor data includes data from one or more sensors on the client device 110 that may aid in accurately positioning the client device 110.

The re-localization module 170 inputs 710 the received data from the client device 110 into a computer vision algorithm to generate one or more candidate pose estimates. A pose estimate indicates the re-localization module 170's prediction of the 3D position and orientation of the client device 110 in the real world. For each candidate pose estimate, the re-localization module 170 also calculates a confidence score representing the probability that the candidate pose estimate is correct.

A data fusion module 180 on the game server 120 maps 715 each of the candidate pose estimates to a position on a prior model of the geographic area (e.g., the city block) in which the user is located. The prior model uses data from a plurality of sources, as discussed above, to generate probabilities regarding where users are likely to be located as well as the likely viewing directions and velocities of users' client devices. In one embodiment, the prior model is a heatmap-style histogram, though other representations of the data and corresponding probabilities may be used in other configurations.

For each candidate pose estimate, the data fusion module 180 uses the prior model to determine 720 a probability that the client device 110 is positioned at the real-world location corresponding to the identified position on the prior model. For example, in embodiments in which the prior model is a heatmap-style histogram, the data fusion module 180 identifies the cell corresponding to each candidate pose estimate and retrieves the associated probability for the identified cell. At 725, the data fusion module 180 fuses the confidence scores generated by the computer vision algorithm with the location probabilities from the prior model to generate an updated confidence score for each pose estimate. The re-localization module 170 compares the updated confidence scores for the pose estimates to a score threshold, initiating 730 the location-based application if the confidence score meets or exceeds the threshold and determining a corresponding position 224 in the virtual world. If more than one confidence score meets or exceeds the score threshold, the re-localization module 170 selects the highest-scoring candidate pose estimate as authoritative. Alternatively, the updated confidence scores are stored (e.g., in the game database 115) and used as input to a temporal fusion algorithm that combines information from multiple frames (up to and including the current frame) received from the client device 110. The updated confidence scores may be used to trigger the start of an AR experience or to provide updated pose estimates if the AR experience has already started.

Example Computing System

Figure 8:
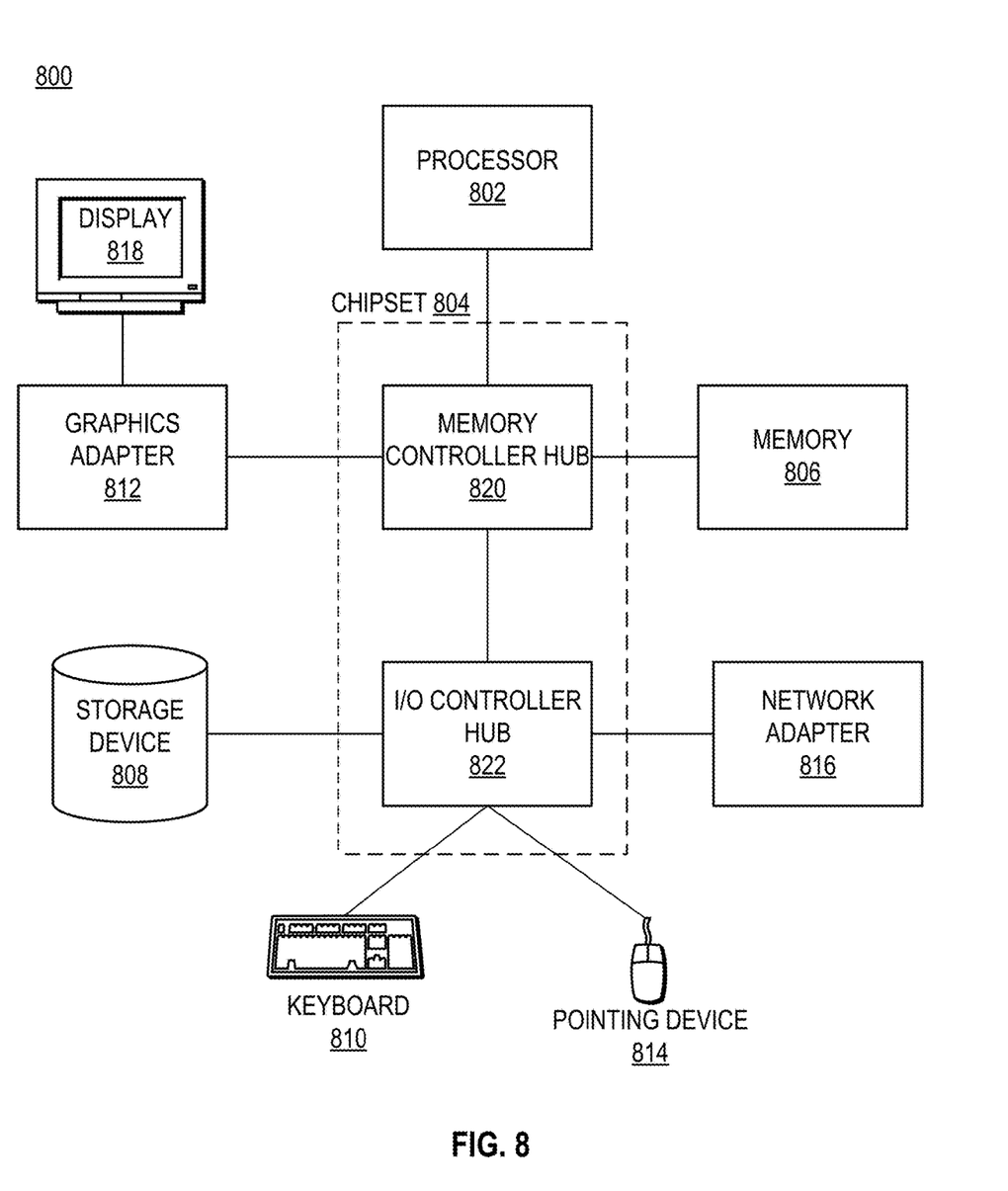
FIG. 8 illustrates an example computer system suitable for use as the game server or client device of FIG. 1, according to one or more embodiments.

FIG. 8 is an example architecture of a computing device, according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random-access memory, such as DRAM, SRAM, DDR RAM, ROM, EEPROM, flash memory.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate+/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for performing re-localization using a GNN. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
receiving camera frame and sensor data from a client device associated with a location-based application;
inputting the received data into a computer vision algorithm to generate candidate pose estimates, each pose estimate representing a prediction of a three-dimensional position and orientation of the client device and having an associated confidence score that is generated based on a combination of a comparison between a captured image of a scene and one or more other images of the scene and a probability map indicating likelihoods of potential candidate poses;
selecting an authoritative candidate pose estimate from the pose estimates using the confidence scores; and
causing the client device to provide location-based content within the location-based application using the authoritative pose estimate.

2. The computer-implemented method of claim 1, wherein the authoritative pose estimate represents a real-world position and orientation of the client device and wherein causing the client device to provide location-based content comprises:
determining a position and orientation of the client device in a virtual world corresponding to the real-world position and orientation; and
generating, based on the position and orientation of the client device in the virtual world, one or more items of virtual content for display by the client device.

3. The computer-implemented method of claim 1, wherein selecting an authoritative candidate pose estimate from the pose estimates comprises selecting a candidate pose estimate having a confidence score that meets or exceeds a score threshold.

4. The computer-implemented method of claim 3, wherein the score threshold may be adjusted to optimize for time, for accuracy, or for both.

5. The computer-implemented method of claim 1, further comprising selecting a highest scoring candidate pose estimate as the authoritative candidate pose estimate.

6. The computer-implemented method of claim 1, wherein the probability map is constructed and updated based on data from a plurality of location data sources including one or more of client device mapping scans of a geographic area, previously identified real-world locations of client devices associated with the location-based application, and existing map data for the geographic area.

7. The computer-implemented method of claim 1, wherein the probability map indicates probabilities that a client device is located at each of a plurality of real-world locations.

8. The computer-implemented method of claim 7, wherein the probability map further indicates probabilities regarding orientation and velocity of a client device at each of the plurality of real-world locations.

9. The computer-implemented method of claim 7, wherein the probability map comprises a heatmap and wherein each cell in the heatmap represents a real-world location of a specified size.

10. The computer-implemented method of claim 1, wherein the location-based application is a parallel-reality game.

11. A non-transitory computer-readable storage medium comprising instructions executable by a processor, the instructions executable to perform operations comprising:
receiving camera frame and sensor data from a client device associated with a location-based application;
inputting the received data into a computer vision algorithm to generate candidate pose estimates, each pose estimate representing a prediction of a three-dimensional position and orientation of the client device and having an associated confidence score that is generated based on a combination of a comparison between a captured image of a scene and one or more other images of the scene and a probability map indicating likelihoods of potential candidate poses;
selecting an authoritative candidate pose estimate from the pose estimates using the confidence scores; and
causing the client device to provide location-based content within the location-based application using the authoritative pose estimate.

12. The non-transitory computer-readable storage medium of claim 11, wherein the authoritative pose estimate represents a real-world position and orientation of the client device and wherein causing the client device to provide location-based content comprises:
determining a position and orientation of the client device in a virtual world corresponding to the real-world position and orientation; and
generating, based on the position and orientation of the client device in the virtual world, one or more items of virtual content for display by the client device.

13. The non-transitory computer-readable storage medium of claim 11, wherein selecting an authoritative candidate pose estimate from the pose estimates comprises selecting a candidate pose estimate having a confidence score that meets or exceeds a score threshold.

14. The non-transitory computer-readable storage medium of claim 13, wherein the score threshold may be adjusted to optimize for time, for accuracy, or for both.

15. The non-transitory computer-readable storage medium of claim 11, wherein the operations further comprise selecting a highest scoring candidate pose estimate as the authoritative candidate pose estimate.

16. The non-transitory computer-readable storage medium of claim 11, wherein the probability map is constructed and updated based on data from a plurality of location data sources including one or more of client device mapping scans of a geographic area, previously identified real-world locations of client devices associated with the location-based application, and existing map data for the geographic area.

17. The non-transitory computer-readable storage medium of claim 11, wherein the probability map indicates probabilities that a client device is located at each of a plurality of real-world locations.

18. The non-transitory computer-readable storage medium of claim 17, wherein the probability map further indicates probabilities regarding orientation and velocity of a client device at each of the plurality of real-world locations.

19. The non-transitory computer-readable storage medium of claim 17, wherein the probability map comprises a heatmap and wherein each cell in the heatmap represents a real-world location of a specified size.

20. The non-transitory computer-readable storage medium of claim 11, wherein the location-based application is a parallel-reality game.

* * * * *